(12) United States Patent  (10) Patent No.: US 6,601,102 B2
Eldridge et al.  (45) Date of Patent: Jul. 29, 2003

(54) SECURE TOKEN-BASED DOCUMENT SERVER

(75) Inventors: Margery A. Eldridge, Cambridge (GB); Michael J. Flynn, Cambridge (GB); Christopher M. Jones, Cambridge (GB); Ralph C. Merkle, Sunnyvale, CA (US); Michael G. Lamming, Cambridge (GB); David L. Pendlebury, Wigan Lancs (GB); Mark Stringer, Huddersfield (GB); Michiel F. E. Kleyn, London (GB)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/063,227

(22) Filed: Apr. 1, 2002

(65) Prior Publication Data

US 2002/0095570 A1 Jul. 18, 2002

Related U.S. Application Data

(63) Continuation of application No. 09/270,320, filed on Mar. 16, 1999, now Pat. No. 6,397,261.

(51) Int. Cl.[7] .............................................. G06F 15/16

(52) U.S. Cl. ...................... 709/229; 709/217; 709/219; 709/225; 713/171; 713/182

(58) Field of Search ................................ 709/217, 219, 709/225, 229; 713/171, 182

(56) References Cited

U.S. PATENT DOCUMENTS 4,405,829 A   9/1983  Rivest et al. ............... 178/22.1
5,555,376 A   9/1996  Theimer et al. ......... 395/200.09

(List continued on next page.)

FOREIGN PATENT DOCUMENTS

EP   0 691 619 A2   1/1996
EP   0 893 759 A2   1/1999
EP   0 893 760 A2   1/1999
GB   2 296 115 A    6/1996

OTHER PUBLICATIONS

Schilit, Bill et al., "Context–Aware Computing Applications", published in *Proceedings Workshop on Mobile Computing Systems and Applications*, IEEE, Dec. 1994, and in Technical Report CSL–94–12, Xerox Palo Alto Research Center, Nov. 1994.

Want, Roy et al., "The PARCTUB Ubiquitous Computing Experiment," published in Technical Report CSL–95–1, Xerox Palo Alto Research Center, Mar. 1995 and in IEEE Personal Communications, Dec. 1995.

*Primary Examiner*—Saleh Najjar

(57) ABSTRACT

A system is presented for transmitting document references or tokens between users of integrated wireless and wire-based communication services. The system includes workstations, files servers, printers and other devices coupled to a wire-based network. Mobile computing devices are coupled to the wire-based network through either IR (infrared) or RF (radio) transceiver gateways. Each mobile computing device appears to hold a user's collection of documents: the device is programmed to receive, transmit, and store document tokens. The system includes a token-enabled document server that uses digital signatures to provide secure transfer of document tokens between users of the mobile computing devices and email clients. The token-enabled document server operates independent of the identity of the holder of the document token. Only the issuer of the document token needs be registered with the signature based document server to properly authenticate document tokens.

16 Claims, 10 Drawing Sheets

U.S. PATENT DOCUMENTS

| | | |
|---|---|---|
| 5,748,735 A | 5/1998 | Ganesan .................... 380/21 |
| 5,771,355 A | 6/1998 | Kuzma ...................... 709/232 |
| 5,862,321 A | 1/1999 | Lamming et al. ........ 395/200.3 |
| 5,903,723 A | 5/1999 | Beck et al. .................. 707/10 |
| 5,953,419 A | 9/1999 | Lohstroh et al. ............... 380/21 |
| 6,061,448 A | 5/2000 | Smith et al. .................. 380/21 |
| 6,085,322 A | 7/2000 | Romney et al. ............. 713/176 |
| 6,144,997 A | 11/2000 | Lamming et al. ........... 709/217 |
| 6,151,675 A * | 11/2000 | Smith .......................... 713/153 |
| 6,169,805 B1 | 1/2001 | Dunn et al. ................. 380/277 |
| 6,192,407 B1 | 2/2001 | Smith et al. ................. 709/229 |
| 6,205,549 B1 | 3/2001 | Pravetz ....................... 713/182 |
| 6,385,655 B1 * | 5/2002 | Smith et al. ................. 709/232 |
| 6,470,086 B1 * | 10/2002 | Smith .......................... 380/255 |
| 6,487,599 B1 * | 11/2002 | Smith et al. ................. 709/229 |
| 6,529,956 B1 * | 3/2003 | Smith et al. ................. 709/229 |

\* cited by examiner

SECURE TOKEN-BASED DOCUMENT SERVER

CROSS REFERENCE TO RELATED APPLICATIONS

This application is a continuation of application Ser. No. 09/270,320 filed Mar. 16, 1999, now U.S. Pat. No. 6,397,261 which claim priority under 35 U.S.C. §119 to UK Patent Application No. 9821100.6, filed Sep. 30, 1998. In addition, cross-reference is made to U.S. Pat. No. 6,421,716 entitled "System For Generating Context-Sensitive Hierarchically Ordered Document Service Menus", 6,487,189, entitled "Mobile Email Document Transaction Service" and 6,430,601 entitled "Mobile Document Paging Service", now U.S. Pat. No. 6,430,601 which are all assigned to the same assignee as the present invention and hereby incorporated by reference.

BACKGROUND OF INVENTION

1. Field of the Invention

The present invention relates generally to a secure communication protocol for providing document services on a network, and more particularly, to a protocol for performing secure token-based document transaction services that includes services for emailing and printing secure document tokens.

2. Description of Related Art

While the use of mobile computing devices is becoming more prevalent among mobile workers, transfer of document information between mobile computing devices is often limited due to inadequate storage capacity on such devices or due to inadequate communication channel bandwidth. To overcome these limitations, many mobile workers carry a laptop computer with them while traveling. Although laptop computers are increasingly smaller and lighter, their functionality, which is designed to meet the requirements of office-based document work, is determined largely by the desktop machines from which they evolved. Powerful editors and spreadsheet applications, for example, that are essential in certain office-based work environments have limited utility while away from the office. In some circumstances, mobile workers carry laptop computers simply to be able to access their documents, and not necessarily to create or edit them.

One mobile document transaction service for overcoming these limitations is disclosed in U.S. Pat. No. 5,862,321 (published also as European Patent Application EP 691,619 A2). More specifically, U.S. Pat. No. 5,862,321 (entitled: "System and Method for Accessing and Distributing Electronic Documents") discloses a system for transferring between computers document identifiers that represent a particular document, rather than the document itself. This system can include any number of workstations, file servers, printers and other fixed devices (including multifunction devices) coupled to a network, as well as a number of mobile computing devices mobile computing device appears to hold a user's personal collection of documents, carried by users and coupled to the network by an infrared (IR) or radio (RE) link. Each with the devices being programmed to receive, transmit, and store document identifiers (e.g., a URL—"Uniform Resource Locator") or document tokens, as defined herein.

Each document token is associated with an electronic document stored in an electronic repository or database. The mobile document transaction service effectively distributes references to documents between mobile computing devices by transmission of document tokens, rather than the documents themselves. For example, a document can be sent to an IR transceiver equipped network printer by "beaming" a document token, which references the document, from a mobile computing device to the network printer. The network printer retrieves the complete document referenced by the document token, and immediately prints a copy of the document. Thus, to a user of the mobile document transaction service, documents are seamlessly passed between users and output or input to devices coupled to networks as expansive as the Internet. Since the document references are small and defined, the documents that they reference can have an arbitrary size and not impact the performance of the mobile computing devices. Advantageously, token based document references can be passed between two mobile computing devices without having to transmit large amounts of data.

Document tokens that are modeled after URLs are not secure. That is, anyone who obtains a copy of a URL is capable of accessing the document to which the URL references. Currently there exists a need for secure document tokens that are not as freely accessible as URLs. It would therefore be desirable to provide a mobile document transaction service that ensures secure transfer of document tokens between mobile computing devices. Such systems would advantageously support document tokens that can only be used a limited number of times or a limited length of time to retrieve the document, thereby avoiding replay attacks. In addition, it would be advantageous to provide an electronic mail system that supports secure transfer of document tokens between mail clients. Such a system would minimize the impact on data throughput of email servers when large files are attached to email messages.

SUMMARY OF INVENTION

In accordance with the invention, there is provided a method and apparatus therefor, for operating on a network a secure document server (or a token-enabled server). The secure document server receives from a holder of a document token a request for a copy of a document identified by the document token. The document token includes issuer content and a signature from an issuer and holder content and a signature from the holder. The secure document server locates in the issuer content a document identifier, a hint to a public key of the issuer, and a public key of the holder. The document identifier specifies where the document is stored on the network. In a key list on the secure document server, the server locates the public key of the issuer using the hint to the public key of the issuer. Subsequently, the server authenticates the issuer content of the document identifier with the public key of the issuer. The server then locates in the holder content of the document a time stamp. The time stamp identifies when the holder of the document token requested the copy of the document. Using the public key of the holder, the server authenticates the holder content of the document identifier. Also, the server verifies that the time stamp is within a predetermined window of time relative to a current time. Finally, the secure document server issues, to the holder of the document identifier, a copy of the document identified by the document identifier when the document token is authenticated. The authentication process allows the secure document server to authenticate a request for the document identified by the document token without prior knowledge of the identity of the holder of the document token.

BRIEF DESCRIPTION OF DRAWINGS

These and other aspects of the invention will become apparent from the following description read in conjunction with the accompanying drawings wherein the same reference numerals have been applied to like parts and in which.

DETAILED DESCRIPTION

A. Operating Environment

Figure 1:
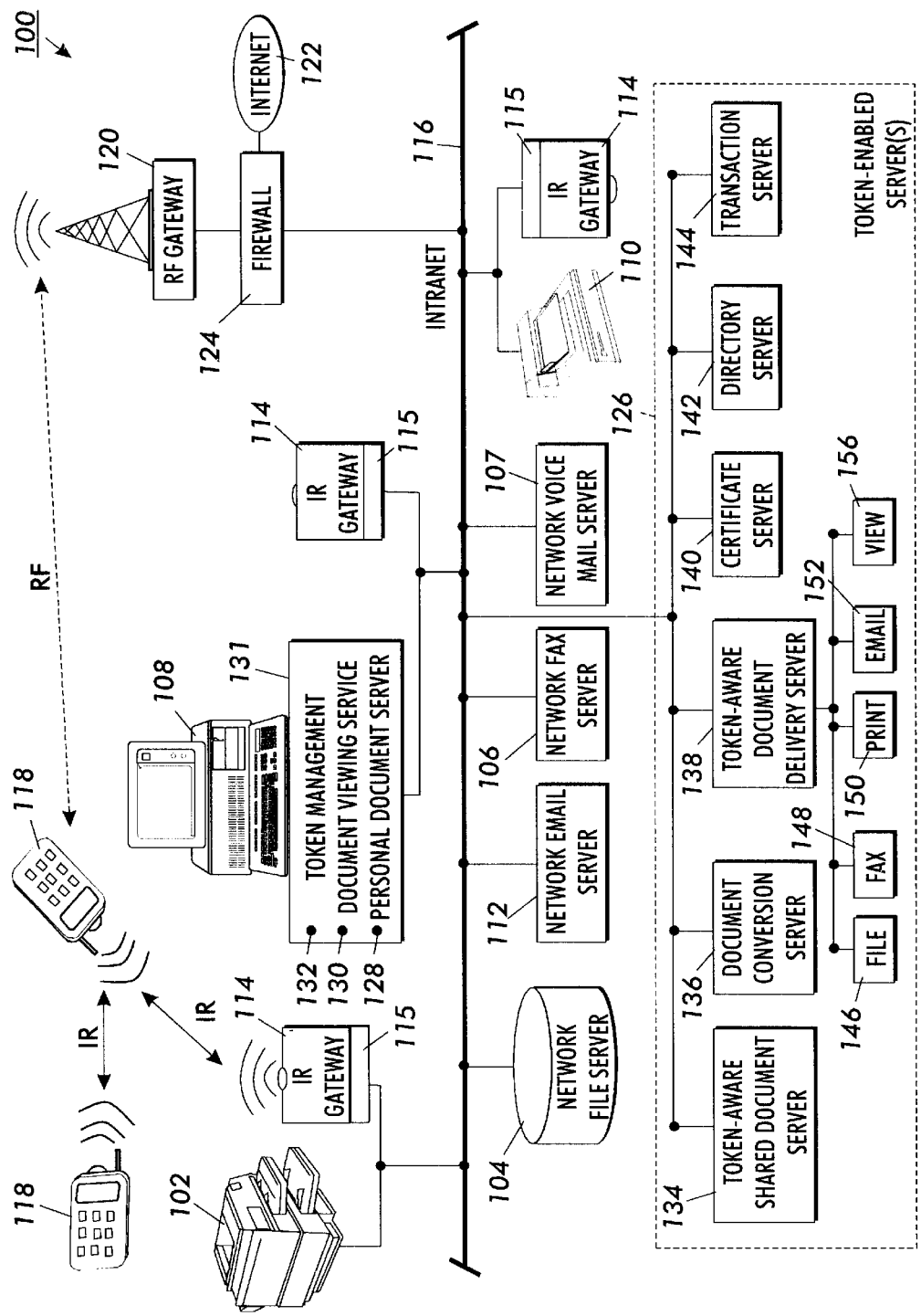
FIG. 1 illustrates a distributed operating environment for performing the present invention.

Referring now to the drawings where the showings are for the purpose of describing the invention, FIG. 1 illustrates a distributed operating environment 100 for performing the present invention. The distributed operating environment includes a plurality of network devices for providing document services. The network devices, which are coupled to wire-based networks 116 and 122, include a printer 102, a file server 104, a network fax server 106, a network voice mail server 107, a personal workstation 108, a scanner 110, and a network email server 112. Generally, these as well as other network devices not shown, communicate using Intranet 116 and gain access to Internet 122 through firewall 124. The network devices communicate over the wire-based networks 16 and 122 using well-known network communication protocols such as TCP/IP.

In addition, FIG. 1 shows mobile computing devices 118. The mobile computing devices 118 are bridged to the wire-based networks 116 and 122 through either IR gateways 114 or RF gateway 120. Such mobile computing devices communicate with each other or other wire-based or wireless devices using either an IR (Infrared) or a radio (RF) transceiver. An example of such a mobile computing device is the Nokia © 9000 Communicator, which is sold by the Nokia Company. The RF transceiver operates over any suitable wireless network such as PCS, GSM, or pager messaging. The IR transceiver uses, for example, communication standards set by the infrared data association (IRDA).

To seamlessly integrate document services across wireless and wire-based networks, the wire-based network is further populated with token-enabled server(s) 126, personal token-enabled workstation elements 131, and IR gateway context insertion slivers 115. These elements operate together in the distributed operating environment to provide users of the mobile computing device 118 with streamlined access to document services available on wire-based networks 116 and 122. Users of token-enabled mobile computing devices 118 are capable of browsing through directories of document tokens. These document tokens represent a user's documents stored on wired-based networks 116 or 122. In addition using token-enabled mobile computing devices, the user is able to apply document services available on networks 116 or 122 to selected document tokens.

Token-enabled mobile computing devices are further described in the following patent applications, which are hereby incorporated by reference: U.S. Pat. No. 5,862,321 (entitled: "System and Method for Accessing and Distributing Electronic Documents"), U.S. patent application Ser. No. 09/118,598 (entitled: "Context-Sensitive Document Transactions"), U.S. Pat. No. 6,515,988 (entitled: "Token-Based Document Transactions") now U.S. Pat. No. 6,515, 988 and U.S. patent application Ser. No. 09/118,221 (entitled: "Token-Based Document Transaction Systems") now abandoned. In addition, further background information relating to network protocols is disclosed by Tanenbaum in "Computer Networks," ISBN 0-13-349945-6.

B. Token-Enabled Server

The token-enabled server 126, which operates on the wire-based networks 116 and 122, communicates with network devices indicated by reference numbers 102, 104, 106,107, 108, 110, and 112, as well as, the RF and IR gateways 114 and 120. The token-enabled server 126 includes token-aware services or servers 134, 136, 138, 140, 142, and 144. These token-aware services can either be operating centrally on token-enabled server 126 or individually on servers distributed over Intranet 116 or Internet 122. The services provided by the token-enabled server(s) 126 are shared between a plurality of users of the mobile computing devices 118.

Transmissions from the mobile computing device 118 are routed through one of the gateways 114 or 120 to transaction server 144. The transaction server 144 is adapted to manage transaction requests from mobile computing devices 118 that involve requests for document services available on networks 116 and 122. The directory server 142 maintains a database of token-enabled devices (e.g., printer 102 and scanner 110). The transaction server 144 communicates with the directory server 142 to look up parameters for satisfying document delivery requests from the mobile computing devices 118. For example, the directory server contains information that relates a particular IR transceiver 114 to its associated network device such as printer 102.

In addition, the transaction server 144 communicates with the token-aware document delivery servers 138 and 128. The token-aware document delivery servers 138 and 128 accept document tokens and retrieve the document that the token represents. Document tokens reference documents stored on the token-aware shared document server 134, the token-aware personal document server 128, or other file servers located on the intranet 116 and the Internet 122 (e.g., network file server 104). Effectively, any mobile computing device 118 can communicate either directly or indirectly with the token-aware document servers 134 and 128.

One purpose of the token-aware document servers 134 and 128 is to function as an interface between token-enabled devices and services and non-token enabled file servers. That is, the token-aware document servers 134 and 128 are used to access a document identified in a document token when that document is stored on a file server that is not token-enabled. Examples of file services that are not token enabled include the Windows NT file service (a product of Microsoft Corporation) and the NFS (Network File System) file service.

A document token (also referred to herein as document references) is a superset of a Uniform Resource Locator (URL) because document tokens include security elements for authentication. Advantageously, document tokens may also reference documents on any standard web server operating on Intranet 116 or Internet 122. It will be appreciated by those skilled in the art, however, that a standard web server does not recognize secure token transactions, and therefore any security elements of tokens are disregarded by the standard web server.

If necessary, the token-aware document delivery server 138 requests that the conversion server 136 convert retrieved documents into an appropriate format. The conversion server 136 converts documents between a number of different document formats such as Microsoft Word, Postscript, and bitmap formats. Interchanging documents between various different formats is known as disclosed, for example, in U.S. Pat. No. 5,210,824.

After retrieving and formatting a document referenced by a document token, the token-aware document delivery server 138 delivers the formatted document to a driver or interface for accessing one of the document processing devices located on Intranet 116 (e.g., printer 102 or personal workstation 108). The drivers or interfaces available on the token-aware document delivery server 138 include a filing interface 146, a fax driver 148, a print driver 150, an email interface 152, or a viewing driver 156. In an alternate embodiment (not shown), the token-enabled server 126 includes a document capture server, which stores and allows access to documents received from input devices such as scanner 110 and fax server 106.

The network gateways 114 and 120, the transaction server 144, the token-aware document delivery server 138, and the token-aware document servers 134 and 128 communicate with the certificate server 140 which stores a list of public keys of users. In requesting a public key from the certificate server 140, a requesting token-enabled server submits a hint of a user's public key. In return, the certificate server 140 supplies a certificate, which contains the user's public key as well as a well-known public key that can be used to authenticate the certificate. In addition, the certificate server 140 can support standard certificates such as the X509 certificates from Verisign Incorporated.

The difference between a token-aware shared document server 134 and a token-aware personal document server 128 is that the shared document server 134 is capable of authenticating requests to fetch documents identified in document tokens using many different key pairs. In contrast, the personal document server 128 may only authenticate requests with one or two key pairs, such as a device key from the mobile computing device 118 and the personal workstation 108. Accordingly, the shared document server 134, unlike the personal document server 128, is adapted to accommodate a number of users operating on Intranet 116.

C. Token Elements on Personal Workstations

Operating on personal workstation 108 are token-enabled personal workstation elements 131, which include a document token management service 132, a token-aware document viewing service 130, and a token-aware personal document server 128. Any combination of these elements may operate on one or more personal workstations 108. The token-aware personal document server 128 provides users operating a mobile computing device 118 with access to documents stored on the particular workstation operating on networks 116 or 122. The token-aware document viewing service 130 provides users of mobile computing devices 118 with the capability of beaming document tokens to the personal workstation 108 and viewing the documents referenced by the document tokens. The document token management service 132 provides a facility for creating document tokens for documents stored, for example, on personal workstation 108 or network file server 104.

D. Token-Enabled IR and RF Gateways

The token-enabled server 126 offers a plurality of document services to users of mobile computing devices 118 through either IR gateway 114 or RF gateway 120. When the gateway 114 receives a document transaction service request from a proximately located mobile computing device 118, the IR gateway 114 forwards the request to the transaction server 144 over Intranet 116. The IR gateway can either be embedded in or be intimately associated with a device that offers document services. For example, the printer 102 shown in FIG. 1 is intimately associated with an IR gateway 114.

Before forwarding the document service request, the IR gateway context insertion sliver 115 authenticates the request using the certificate server 140 and appends context information to the request. Document service requests that arrive either from RF gateway 120 or Internet 122 are authenticated at firewall 124. Forming part of the RF gateway 120 is a dialup server for establishing connections between wire-based and wireless networks. Typically, such a dialup server establishes PPP connections with the mobile computing devices 118 and thereby provides a communication link with the token-enabled server 126 operating on network 116.

In order to establish a connection through a particular IR gateway 114, the IR port of the mobile computing device must have an unobstructed path and be within one meter of the IR gateway 114. In one embodiment when making a document service request, a mobile computing device 118 attempts to access an IR gateway 114 before attempting to access the RF gateway 120. When a mobile computing device 118 is unable to establish an IR connection, the mobile computing device 118 attempts to establish an RF connection over RF gateway 120. Thus, a user must consciously position the mobile computing device 118 proximate to an IR gateway in order to establish an IR link; otherwise by default, an RF link is established unless instructed not to by the user of the mobile computing device. To provide feedback to the user, a message of the status of attempted or established IR or RF connections is presented on a user interface of the mobile computing device.

E. Overview of Secure Document Tokens

In accordance with one aspect of the invention, the token-enabled server 126 provides a system for controlled distribution of document tokens in a mobile environment. An example of a document token is identified in FIG. 2 by reference number 12. Advantageously, the document tokens as described herein can be readily used with existing applications. In addition, the document tokens as described herein have the advantage of being self-contained. That is, the document tokens can be passed from one person (or user) of a mobile computing device to another without requiring the server administering the document tokens to know the identity of anyone other than the issuer of the document token. Consequently, secure access rights can be administered with respect to a document token in a manner that is independent of the holder of the document token.

F. Secure Email Attachment Tokens

Figure 2:
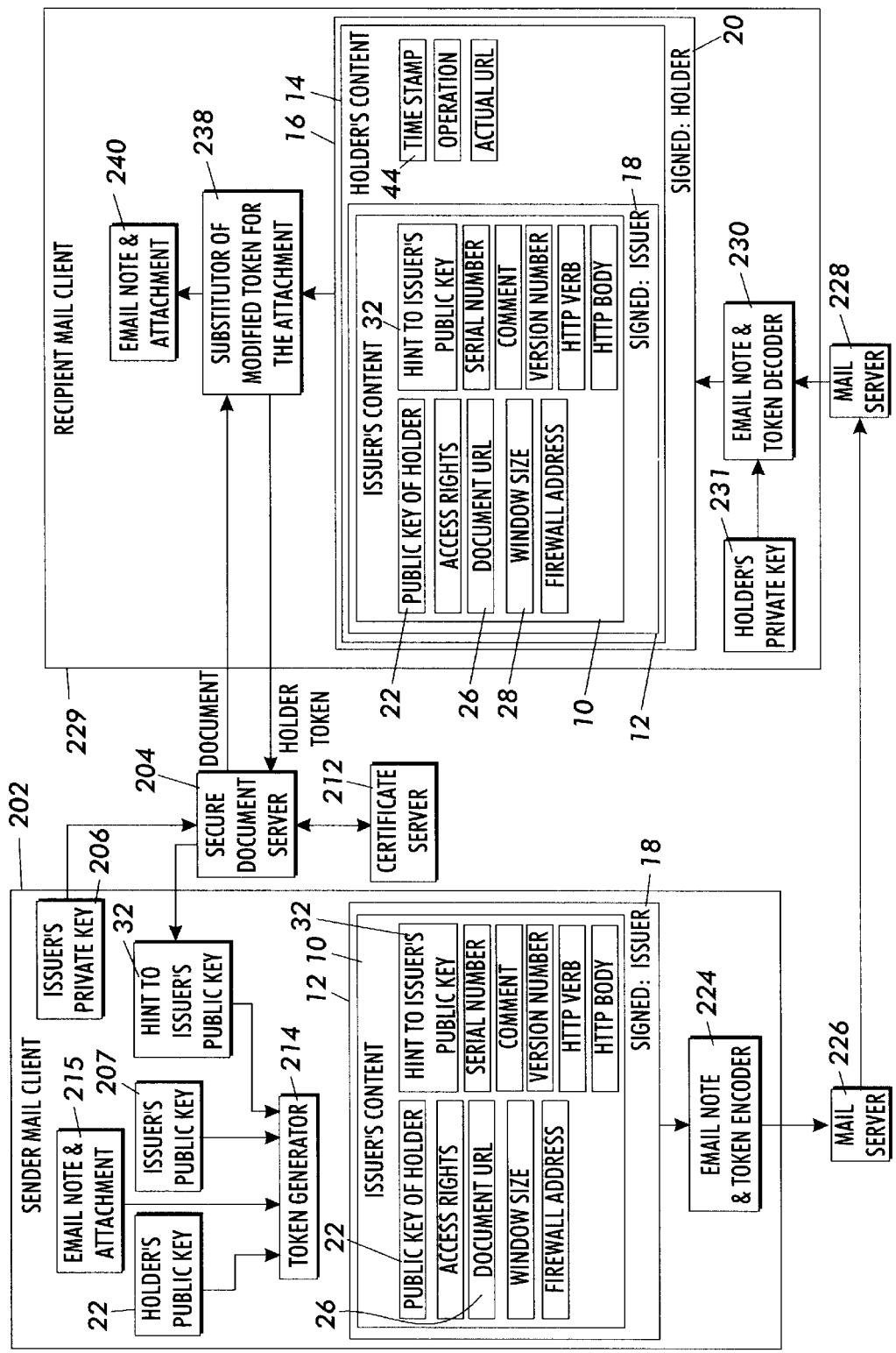
FIG. 2 illustrates an embodiment of the invention in which document tokens are substituted for document attachments appended to email messages.

FIG. 2 illustrates a first embodiment of the invention in which secure document tokens are substituted in place of document attachments that are appended to email messages. Using secure document tokens, large attachment files are automatically replaced by a sender's email client 202. The secure document token provides a reference to a single copy of the document that is stored where the email message originates. The substitution of secure document tokens for email attachments can either be performed automatically or manually on a per-document basis. In one embodiment, an automatic setting specifies that all email attachments are converted to document tokens. In another embodiment, the automatic setting only converts those email attachments that are above a predefined size.

During system initialization, a user of the sender email client 202 provides a secure document server 204 with a public key 206 of the issuer (or sender). In return, the secure document server 204 may issue the sender's mail client a hint 32 to the issuer's public key 206. The reason for issuing a hint is to reduce the issuer's content of an issuer's document token 12. The issuer's public key 206 and the issued issuer's public key hint 32, received during system initialization, are stored in certificate server 212 (or certificate authority) for later use by the secure document server 204.

During normal operation, the user of the sender email client 202 composes an email note with a document attachment 215. Subsequently, token generator 214 filters the contents of the email note and attachment 215. When an email document attachment is identified, the token generator 214 specifies a storage location and a filename of the email document attachment (e.g., document URL 26) in an issuer's document token 12, which includes the issuer's content 10 and signature 18. The document URL 26 can identify either an existing storage location and filename or a storage location and filename created by the token generator 214. In either case, the document URL 26 is a storage location on the networks 116 or 122 that is accessible by the secure document server 204. After identifying or specifying a location for the email document attachment, the token generator 214 substitutes the email document attachment for the client document token 12 in the email note and attachment 215.

Before the email message can be sent, the desired recipient (or holder) of the email attachment provides the sender with a holder's public key 22. The holder's public key 22 can be delivered to the sender in any number of ways.

What is critical is that the sender trusts that it is the holder who is providing the public key; otherwise, the sender may be delivering the secure document token to an improper holder.

Subsequently, the token generator 214 inserts the holder's public key 22 and the hint to the issuer's public key 32 into the document token 12. A private key 207 of the issuer is used by the token generator 214 to produce the signature 18 of the document token 12, that is to be substituted for the document attachment of the email message. The manner in which the issuer signature 18, as well as, other elements forming part of the issuer content 10 are generated is described in detail below. After forming the document token 12, encoder 224 substitutes the document token 12 for the original document attachment in the email note and attachment 215. Subsequently, the encoder 224 transmits the email note and document token using a conventional mail protocol (for example, SMTP) to mail server 226.

After a recipient's mail server 228 is notified of the email message sent from the sender mail client 202, the recipient mail client 229 becomes aware of the mail message after polling the mail server 228 for new mail. The mail client upon receipt of the mail message decodes the message using the email note & token decoder 230. The decoder 230 extracts the issuer's document token 12 from the received email message and produces holder's document token 16. The holder's document token 16 includes holder content 14 and a holder signature 20.

Forming part of the holder content 14 is a time stamp 44. The time stamp 44 is filled in once the recipient mail client 229 seeks to redeem, from the secure document server 204, the document token 12 for the document referenced by URL 26. To properly redeem the document token for the document referenced by URL 26, the recipient mail client 229 must redeem document token 16 within a window size 28 of the current time at which signature 20 of holder's content 14 is generated. The holder content 14 is signed to produce signature 20 using a private key 231 of the token holder. The holder's private key 231 corresponds to the holder's public key 22. Other elements forming part of the holder content 14 are discussed below in Section G.7.

Once a document token 16 is generated by decoder 230 as set forth in FIG. 2, the token 16 is sent to the secure document server 204 to be redeemed for the document identified by URL 26. Upon receipt of the (holder) document token 16, the secure document server 204 authenticates the issuer content 10 and the holder content 14. Initially, the secure document server 204 retrieves from the certificate server the issuer's public key 206 using the hint to the issuer's public key 32. The issuer's content is then authenticated using the issuer's signature 18 and the issuer's public key 206. In addition, the holder content is authenticated using the holder's public key 22 located in the issuer content 10 and the holder's signature 20. Also, the difference between the time stamp and the time at which the token was received by the secure document server 204 is checked to verify that it falls within the window size 28. Document tokens with time stamps that fall outside the window size are discarded.

Upon receipt from secure document server 204 of the document referenced by the document token 16, substitutor 238 inserts the document into the email message to define email note and attachment 240. It will be appreciated by those skilled in the art that email note and attachment 215 and email note and attachment 240 are almost identical except that email note and attachment 240 includes email transmission information. It will also be appreciated by those skilled in the art that the email attachment token substitution system presented in FIG. 2 behaves similarly to conventional email client-server systems. The present invention, however, adds means for substituting a document attachment for a document token. Other than the delay caused by the token generator 214 and the decoder 230, retrieval of the document attachment (in original email note and attachment 215) from the secure document server 204 instead of the mail server 228 is transparent to the sender and recipient mail clients.

In an alternate embodiment, the secure document server 204 is coupled to a central file server (not shown in FIG. 2) which maintains a copy of documents referenced by tokens. This alternate embodiment assures recipients of the accessibility of documents when reading their email. In yet another embodiment, the token generator 214 can be defined as a separate proxy process that operates between the sender's mail client 202 and the mail server 226. In this alternate embodiment, the proxy process would service all mail clients that utilize the mail server.

G. Secure Document Tokens For Mobile Computing Devices

G.1 Transmitting Document Tokens Between Mobile Computing Devices

FIGS. 3–9 illustrate a second embodiment of the invention in which secure document tokens provide users of mobile computing devices secure access to the document identified by URL 26 in the document token 12.

Figure 3:
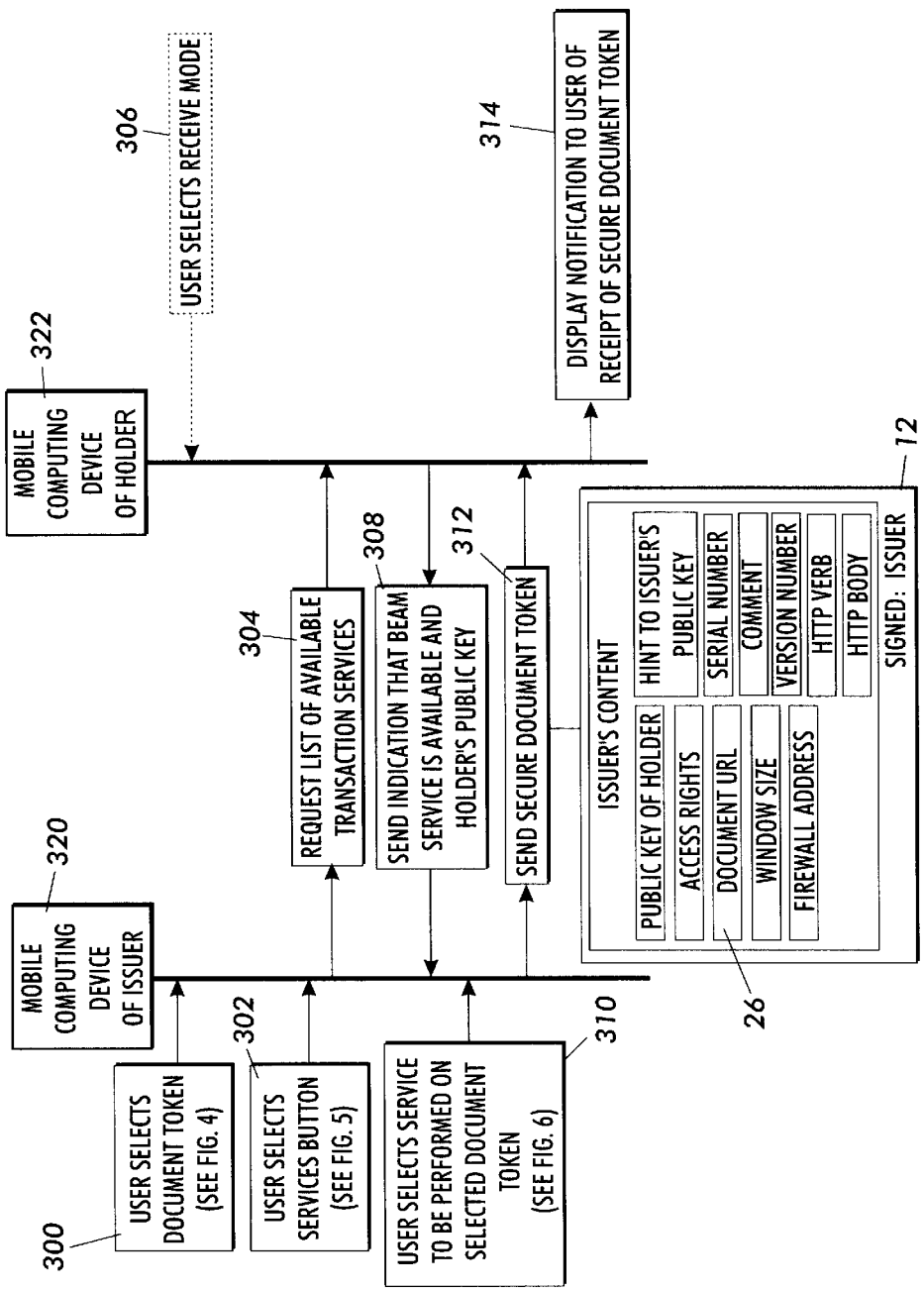
FIG. 3 illustrates a communication sequence for transmitting a document token from a user of one mobile computing device (i.e., an issuer) to a user of another mobile computing device (i.e., a holder) for carrying out another embodiment of the invention.
Figure 4:
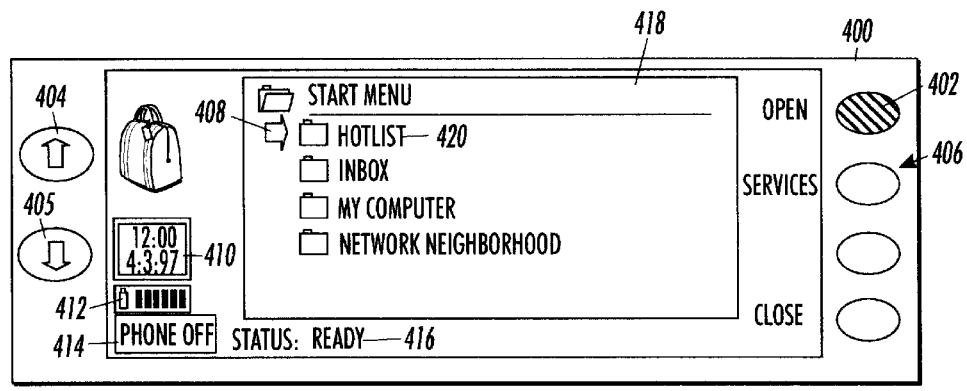
FIGS. 4–6 illustrate a user interface that operates on the mobile computing devices for performing user-specified operations set forth in FIGS. 3, 7 and 8.
Figure 5:
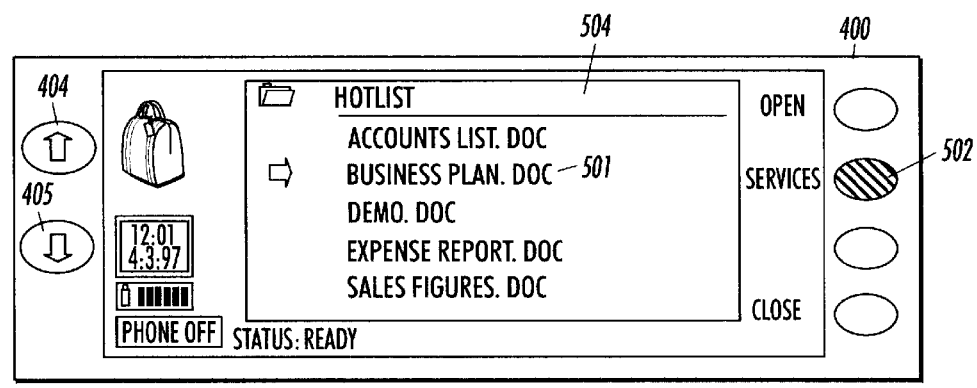
Figure 6:
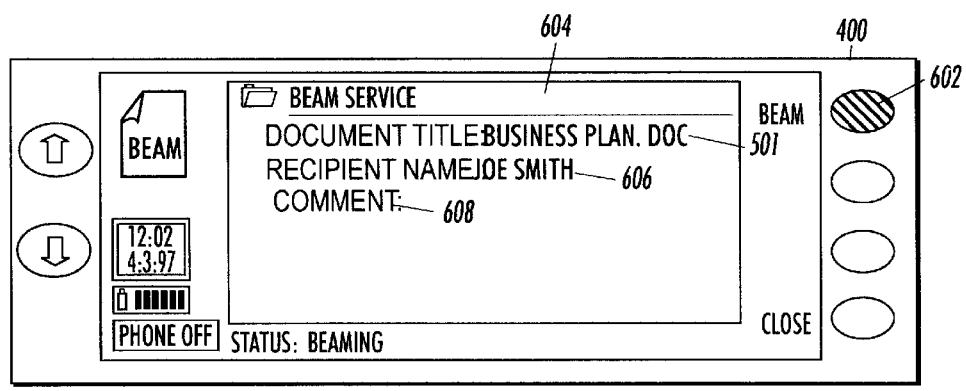

FIG. 3 illustrates a communication sequence for transmitting the document token 12 from a user of one mobile computing device 320 (i.e., an issuer device) to a user of another mobile computing device 322 (i.e., a holder device). The issuer device 320 initially selects a document token at action 300. The selected document token 12 is not complete at this stage but contains at least a document URL 26. The action 300 is performed, for example, on a user interface 400 of the mobile computing device 118, which is shown in FIG. 4. More generally, FIGS. 4–6 illustrate a user interface 400 that operates on the mobile computing devices 118 for performing user-specified operations set forth in FIGS. 3, 7 and 8. By way of overview, the user interface 400 includes scroll buttons 404 and 405, command buttons 406, selection indicator 408, time and date indicator 410, battery power indicator 412, field strength indicator 414, and operational status indicator 416.

More specifically, the user selects a document token from "Hotlist" folder 420, which is accessible from the start menu screen 418 shown in FIG. 4. Each document in the "Hotlist" folder is a document token. Each document token consists of a reference to a document and not the contents of the document. Storing document tokens advantageously minimizes the memory requirements of the mobile computing devices 118, as well as, the bandwidth required for transmitting information from a mobile computing device to other mobile computing devices or other computing devices that are coupled to networks 116 or 122.

By selecting the "open" command button 402, the content of the "Hotlist" folder is displayed in the display screen 504 shown in FIG. 5. From the display screen 504, the user selects document token title 501, which references document token 12. Subsequently, the user selects the "services" button 502 at action 302. If a user wishes to beam a document token to the holder device 322, it must be within range to receive IR transmissions from the issuer device 320. When in range, the issuer device 322 receives a request for a list of available transaction services from issuer device 320 at action 304. In one embodiment, the holder device 322 is always in receive mode and therefore action 306 need not be performed. In another embodiment, the user of the mobile computing device prepares the device to receive IR transmissions by performing the action 306.

At action 308, the holder device 322 responds to the request for services by sending over an IR link to the issuer device a message indicating that a beam service is available. Appended to the message is the holder's public key 22 (identified in FIG. 10), which is inserted in the document token 12 by the issuer device 320 at action 310. In addition, at action 310 the user of the issuer device selects the beam service button 602 shown in beam service screen 604 in FIG. 6. The beam service is then performed at action 312 by beaming the token 12 identified by the document title 501 to the recipient 606 (shown in FIG. 6). The beam service screen 604 includes a comment field 608 for the issuer to specify a comment for the holder of the token 12.

Figure 10:
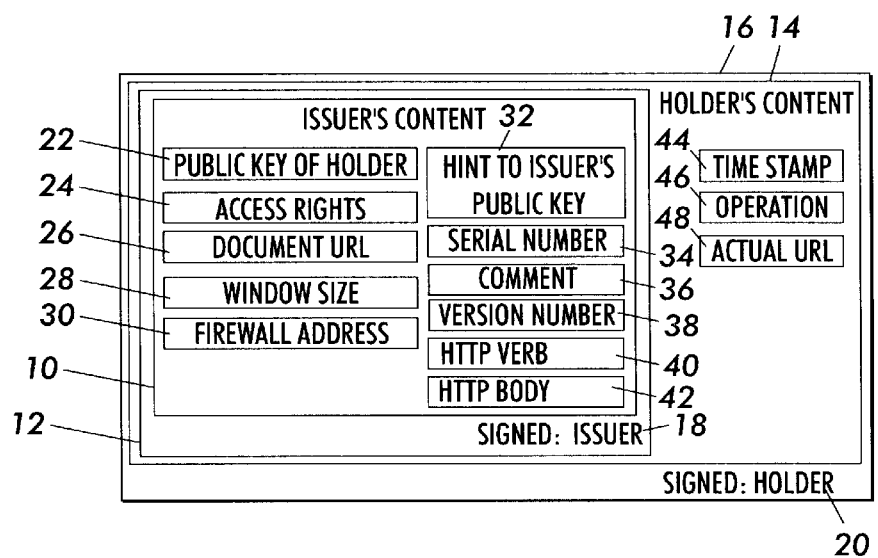
FIGS. 10 and 11 illustrate the elements of different document tokens used to provide secure access to document services in accordance with the present invention.

However, before transmitting the document token 12 to the holder device 322 at action 312, the issuer device 320 prepares the secure document token by completing the elements of the document token 12. Once the elements of the token are filled in, the issuer signs the token 12. The elements of token 12, which are illustrated in FIG. 10 in issuer content 10, are set forth below in Section G.3. In addition, the manner in which the token is issued is described below in Section G.4 and illustrated in FIG. 12. Once the document token is completed by issuer device 320, it is transmitted to holder device 322 at action 312. Upon receipt of the document token 12, the holder device 322 displays a notification to the holder at action 314.

Figure 7:
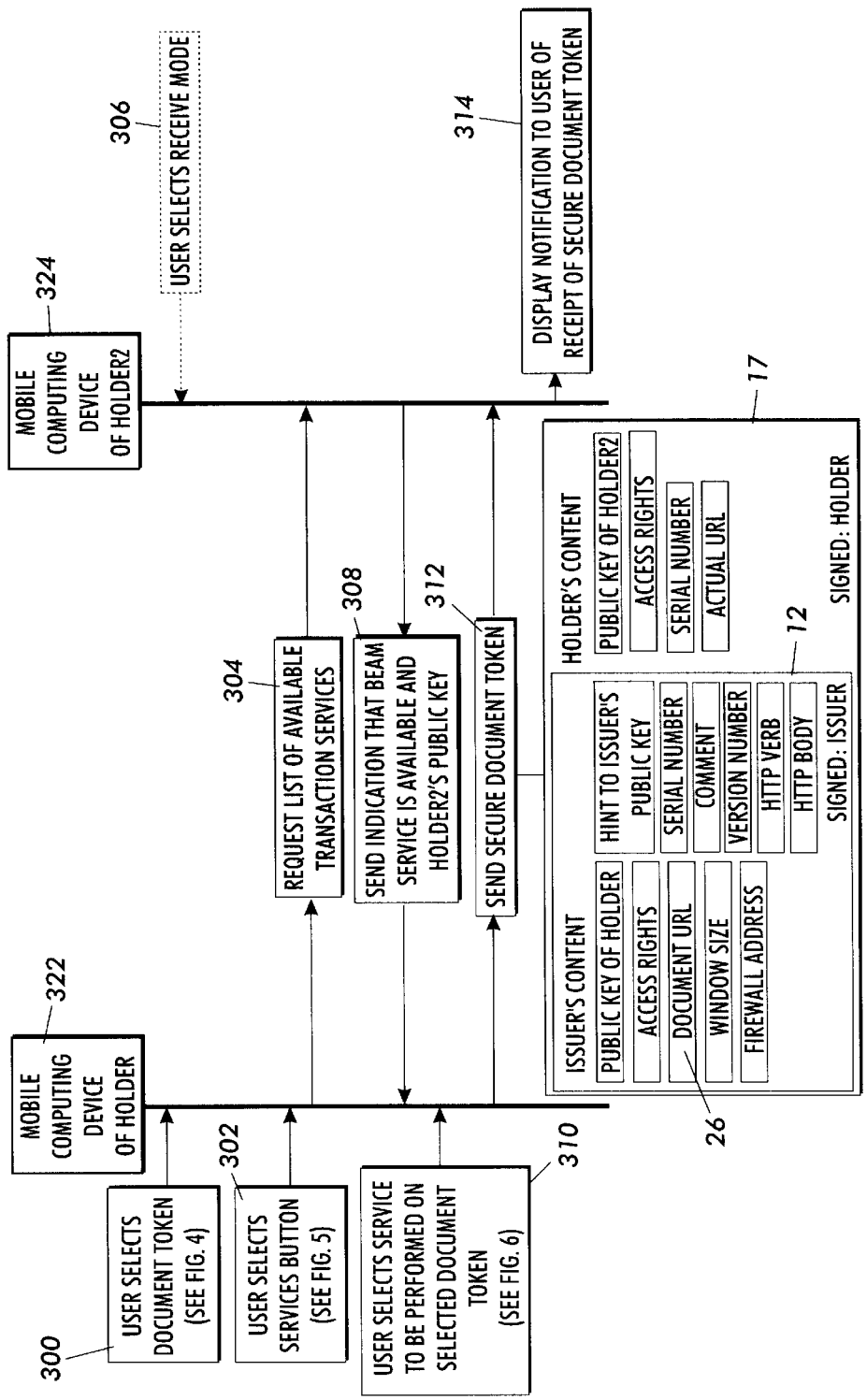
FIG. 7 illustrates a communication sequence for transmitting a document token that has already been issued from a user of one mobile computing device (i.e., a holder) to a user of another mobile computing device (i.e., a holder2)
Figure 8:
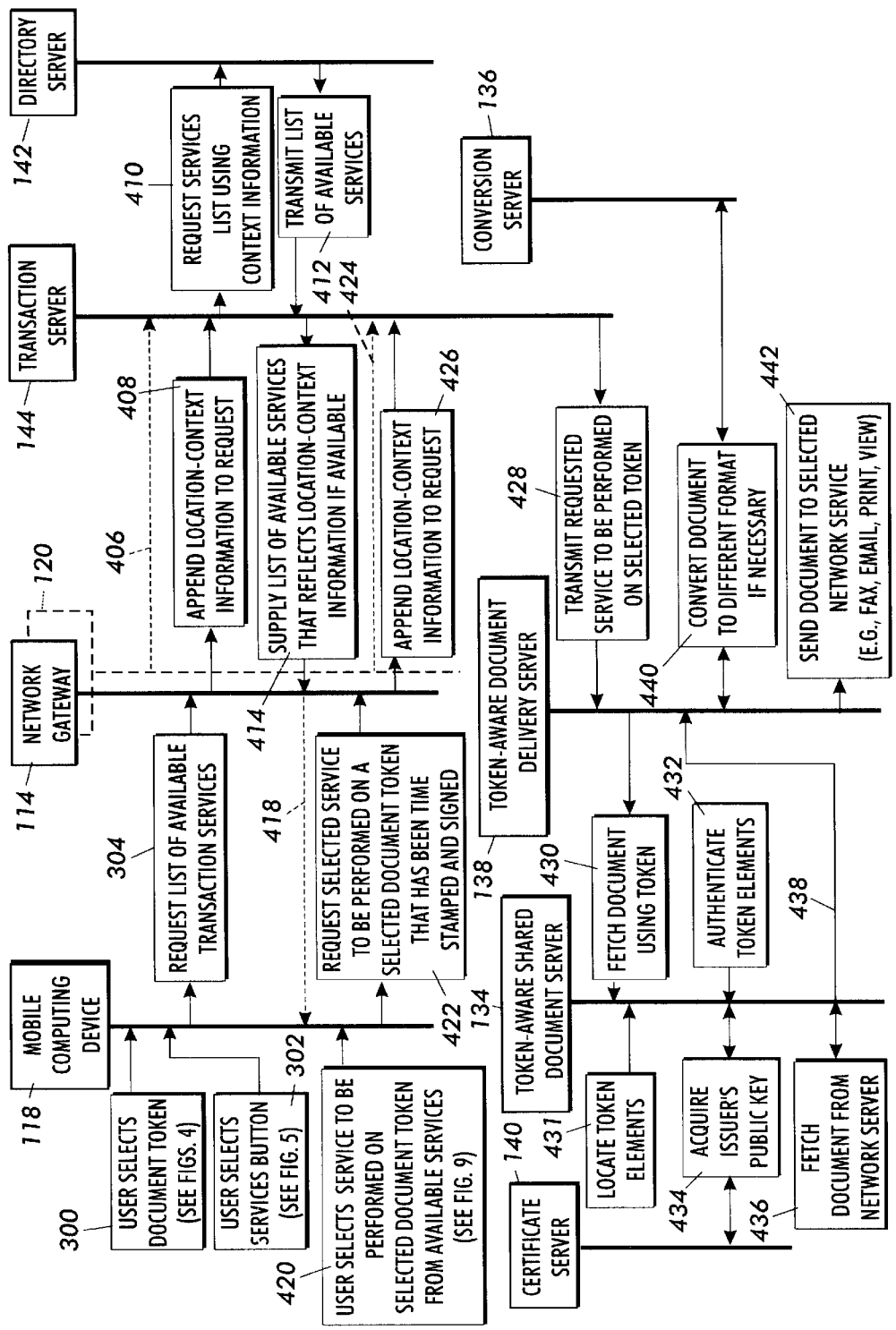
FIG. 8 illustrates a transaction protocol that is performed from any mobile computing device in the operating environment illustrated in FIG. 1.
Figure 11:
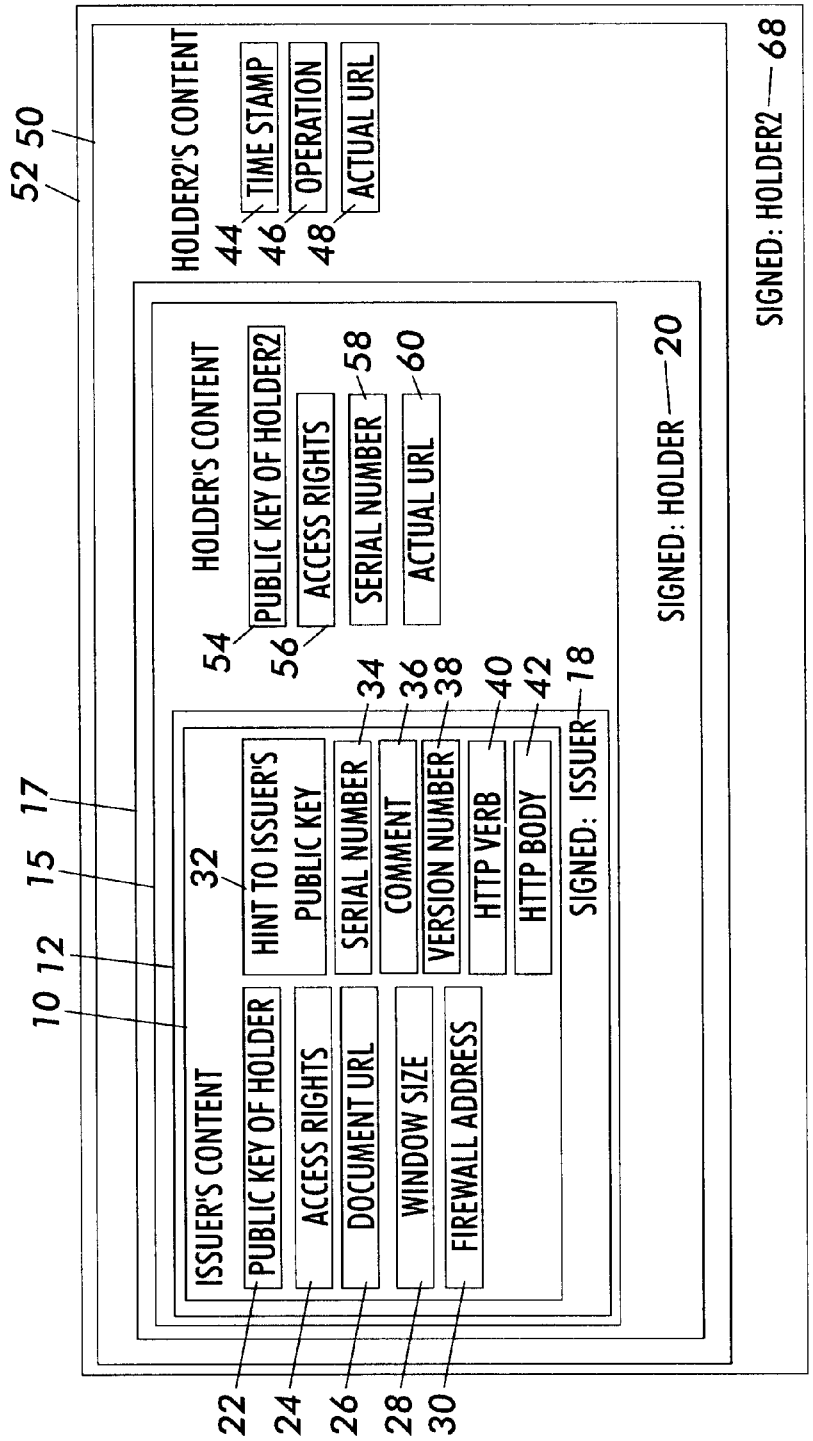

FIGS. 7 and 8 illustrate two different actions that the holder device 322 can perform once the document token 12 is received from the issuer device 320. FIG. 7 illustrates the action of beaming the token to another mobile computing device (e.g., holder2 device 324). The actions performed in FIG. 7 are identical to those set forth in FIG. 3 except that the token transmitted from holder device 322 to holder2 device 324 is now document token 16 which includes holder content 15 and the holder's signature 20 (shown in FIG. 11), as well as, the original document token 12 received from the issuer device 320. The elements of the holder content 15 set forth in FIG. 11 are described below in Section G.3.

G.2 Invoking the Token-To-Print Service At A Mobile Computing Device

FIG. 8 illustrates a transaction protocol that is performed from any mobile computing device 118 to the token-enabled server operating in environment 100 illustrated in FIG. 1. More specifically, the transaction protocol illustrated in FIG. 8 defines the actions to be performed by the token-enabled servers 126 for providing a token-to-print transaction service. By way of overview, the protocol provides a method for the token-enabled server 126 to respond to a print request from a mobile computing device 118 by recovering a document identified by a selected document token and directing the recovered document to be printed on a printer specified by the mobile computing device.

Generally, the actions set forth by mobile computing device 118 shown in FIG. 8 can be performed by any mobile computing device holding a document token. Consequently, either issuer device 320, holder device 322, or holder2 device 324 can request a document to be serviced using the transaction protocol set forth below and illustrated in FIG. 8. Although the example described below is directed at printing, it will be appreciated by those skilled in the art, however, that the protocol can also be used to perform other document transactions such as emailing, faxing, or viewing a document identified by a selected document token.

The transaction protocol for providing a token-to-print service is invoked by a user of the mobile computing device 118 by selecting a document token and transmitting a request for a list of available services, as indicated by actions 300, 302, and 304 which are discussed in detail above. It should be noted that even though the information for displaying the content is local to the mobile computing device, the device may automatically or in response to a command re-synch its content with the content of the user's personal workstation 108. In one embodiment, the content of the personal workstation of a user is mirrored on the display screen of the mobile computing device. Tokens are implicitly constructed as a mobile computing device browses files and folders accessible via the token-aware document server 126. A mobile computing device implicitly constructs a token by assembling filename, host name, protocol, and security information about a document.

Referring again to FIG. 8, in response to the action 302 of selecting the services button for the document selected at action 300, mobile computing device 118 transmits a request for a list of available transaction services for that user at action 304. Because no IR link with another mobile computing device is established, the request is transmitted to wire-based networks 116 and 122 through either gateway 114 or 120. When the requested action 404 is transmitted through one of the IR gateways 114, a location context is appended by context insertion sliver 115 at action 408; otherwise, no context information is appended to the requested action 404 at the RF gateway 120 as indicated by arrow 406.

Communications from mobile computing devices 118 that are received by either gateway 114 or 120 are transmitted to an available transaction server 144. Upon receipt of a request for available services, the transaction server 144 transmits a request at action 410 using available context information provided by the directory server 142. Responsive to the request, the directory server 142 provides the transaction server 144 with a list of available document transaction services at action 412. More details of context sensitive responses to requests for lists of available services are disclosed in U.S. Pat. No. 6,421,716 entitled "System For Generating Context-Sensitive Hierarchically Ordered Document Service Menus" now Pat No. 6,421,716. Subsequently, the transaction server 144 transmits to the network gateway 144, at action 414, a list of available services that reflects location-context information if available. Upon receipt, the network gateways 114 or 120 communicate the information relating to available services to mobile computing device 118 at action 418.

Figure 9:
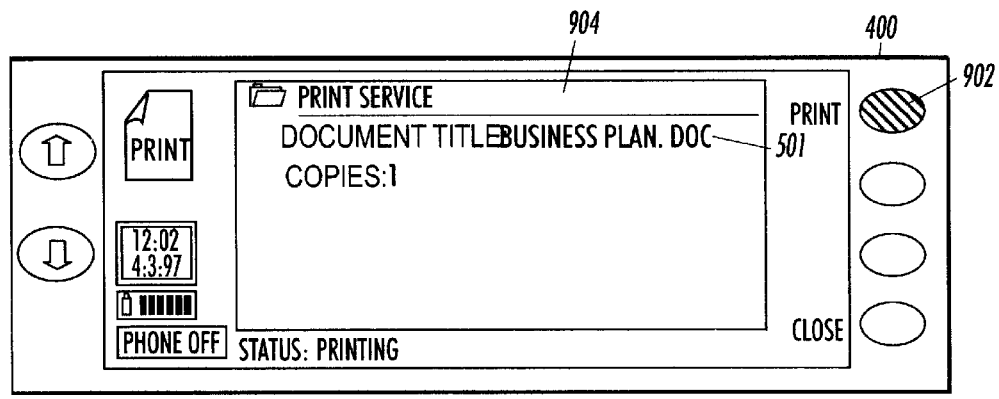
FIG. 9 illustrates a user interface that operates on the mobile computing devices for performing user-specified operations set forth in FIG. 8.

Once a list of available services is received at the mobile computing device 118, the "Print Service" screen 904 shown in FIG. 9 is presented at user interface 400. After being presented with display screen 904, a user invokes the print command button 902 at user action 420. The display screen 904 shown in FIG. 9 illustrates what occurs when the mobile computing device 118 communicates with an IR gateway 114, which is associated with a printer 102. If the mobile computing device had instead communicated using an RF gateway 114, the display screen 904 would have instead provided the user with a selection of document services.

It will, however, be appreciated by those skilled in the art that changes in behavior due to context need not be limited to different communication media (e.g., the difference between RF and IR). Instead, behavioral changes due to context can be specified using any communication media that allows the location of a device to be determined. (For example, short-range communications using a particular RF technology can have the same properties as IR communications media.) Responsive to selection of command 902, mobile computing device 118 returns to either display screens 418 or 504, which are shown in FIGS. 4 and 5, respectively. A user of the mobile computing device 118 can retrieve progress of any document transaction service requested by opening a service request status log (not shown).

At action 422, the mobile computing device 118 transmits the request specified by the user in display screen 904 (shown in FIG. 9) on a selected document token. However, before transmitting the request at action 418, the mobile computing device 118 prepares the selected document token. Thus before performing action 418, the holder of the token prepares it to be cashed in (or validated), to recover the document that it references, by time stamping and signing it. The exact format of a document token varies depending on whether it is the issuer, holder, or subsequent holders (e.g., holder2) of the document token who cashes the token in. That is, a document token varies in size depending on how many holders the document token is passed between. For the holder device 322 and the issuer device 320, the token being cashed in appears as token 16 illustrated in FIG. 10. (In the case of the issuer, the token 16 is signed twice by the issuer.) For the holder2 device 324, the token being cashed in appears as token 52 illustrated in FIG. 11. Further details for preparing a document token to be cashed in are described below in Section G.5.

Upon receipt of the service request, the IR network gateway 114 appends location-context information at action 426 (while the RF gateway 120 does not append context information at action 424) before transmitting the received service request to the transaction server 144. Subsequently at action 428, the transaction server 144 transmits the service request for performing the token-to-print service on a selected document token to the token-aware document delivery server 138. At action 430, the token-aware document delivery server 138 requests that the document be fetched from a token-aware document server, which in this example is the token-aware shared document server 134. It will be appreciated by those skilled in the art that the actions performed by token-aware shared document server 134 which forms part of token-enabled server 126 are similar to those performed by secure document server 204 shown in FIG. 2 to redeem (or cash in) a document token.

Initially at action 431, the token-aware shared document server 134 locates elements of the document token received from the token-aware document delivery server 138. The token elements that are located at action 431 for the token 16 form part of the issuer content 10 and the holder content 14. The token-aware shared document server 134 then authenticates the document token at action 432. Part of the process of authenticating the document token is performing action 434 for acquiring the public key of the original user issuing the document token. Details for authenticating elements of the token are described below in Section G.6. Although not shown in FIG. 8, authentication of the document token can be performed at network gateways 114 and 120, the transaction server 144, and the token-aware personal document server 128.

After authenticating the token, the token-aware shared document server 134 fetches the document from its physical location on the network file server 104 or the like, at action 436. The fetched document is then forwarded to the token-aware document delivery server 138 at action 438. If necessary, the token-aware document delivery server 138 performs action 440 to convert the document acquired from the token-aware shared document server 134 into a format specified either by the sender or the selected print service using the conversion server 136. Finally, to complete the actions performed by the token-enabled servers 126 in performing the token-to-print transaction service, the document delivery server sends the document acquired by the token-aware shared document server 134 to the specified printer 102.

G.3 The Elements of A Document Token

FIGS. 10 and 11 illustrate the elements of different document tokens used to provide secure access to document services in accordance with the present invention. The most primitive token is document token 12, which is passed to another user of a mobile computing device as illustrated in FIG. 3 or cashed in as illustrated in FIG. 8. The token 12 has two sections: issuer's content 10 and an issuer's signature 18. The issuer's content 10 includes the following fields which are defined below in Section G.7: the holder's public key 22, access rights 24, a document URL 26, a window size 28, a firewall address 30, a hint to the issuer's public key 32, a serial number 34, a comment field 36, a version number 38, an HTTP verb 40, and an HTTP body 42.

In the event a user of a mobile computing device wishes to retrieve a document that is referenced by the token (i.e., cash the token in), the original token 12 takes on the form of token 16, which is illustrated in FIG. 10. The token 16 has three sections: the document token 12, holder's content 14, and holder's signature 20. Fields forming the holder's content 14 include a time stamp 44, an operation 46, and an actual URL 48.

When the document token 12 is passed from one holder to another holder as illustrated in FIG. 4, the document token takes the form of document token 17, which is illustrated in FIG. 11. Similar to the token 16, token 17 has three sections: document token 12, holder's content 15, and holder's signature 20. However, unlike the holder's content 14, the holder's content 15 of the token 17 includes fields for a public key of holder2 54, access rights 56, a serial number 58, and an actual URL 60. When the token 17 is cashed in at the token-enabled server 126, it takes the form of token 52, which has three sections: holder2's content 50, holder2's signature 68, and token 17. The holder2's content has the same fields as the holder's content 14 shown in FIG. 10. In the event holder2 passes on the token 17 to holder3 instead of cashing it in, the holder2's content 50 is replaced with the fields set forth in the holder's content 15. Accordingly, a document token expands in size as it is passed from one holder to another. More specifically, each holder has a holder's content section with fields 54, 56, 58, and 60, except for the holder cashing the token in who has fields 44, 46, and 48.

In another embodiment, the token-enabled server 126 minimizes the size of an expanded token. In this alternate embodiment, a holder submits the token, either manually or automatically (for example after it grows beyond a desirable size), to the token-enabled server 126 to be minimized. The token-enabled server 126 minimizes the token by validating it and substituting for it a new token using the public key of the token-enabled server. While this alternate embodiment ensures that tokens do not exceed a specified size, it has the disadvantage of losing the ability to trace the history of the document token's origin when it is eventually cashed in. To avoid this disadvantage, the token-enabled server 126 can record a token's history along with its serial number, location, filename, issuer, and holder when it issues a new token.

G.4 Issuing A Document Token to A Holder

Figure 12:
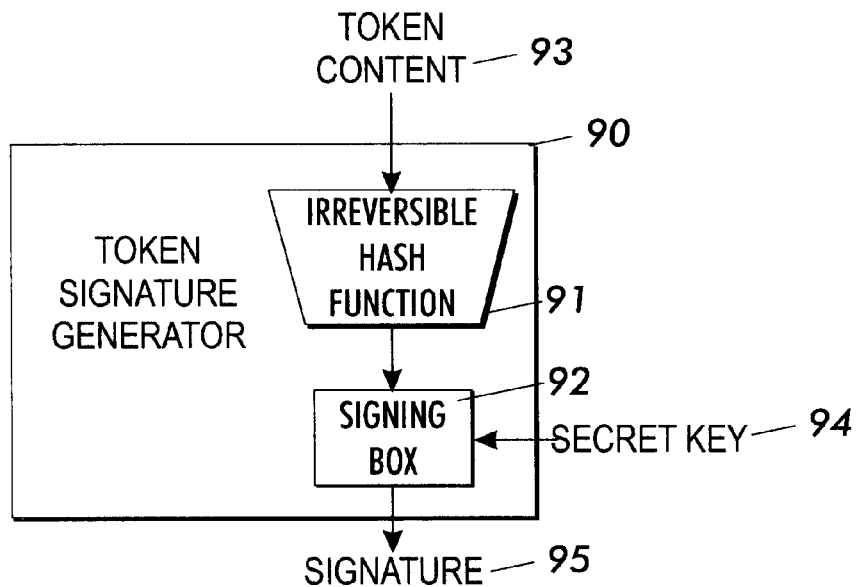
FIG. 12 illustrates the manner in which the signature of a document token is generated.

When a document token is issued or cashed in, the content of the token is signed using a digital signature standard (DSS). FIG. 12 illustrates one known manner of implementing a DSS. In FIG. 12, a token signature generator 90 produces a signature 95 for token content 93 using a secret key 94 of the user signing the content 93. The token signature generator includes an irreversible hash function 91 and a signing box 92. One example of an irreversible hash function 91 is the Secure Hash Algorithm (SHA) which generates 160-bit hashes. The signing box 92 in one embodiment performs the functions of a Digital Signature Algorithm (DSA). Details of the DSA and the DSS are described in the US Federal Information Processing Standards Publications (which are made available on the Internet at http://www.itl.nist.gov/div897/pubs/fip 186.htm).

More specifically, any time a token is passed from an issuer to a holder, as illustrated in FIG. 3, or from a holder to another holder, as illustrated in FIG. 7, or cashed in for a document service (e.g., viewing, emailing, faxing, printing, etc.), as illustrated in FIG. 8, the token content 93 is signed using that user's secret key 94. The token content 93 set forth in FIG. 12 can be any one of the token contents 10, 14, 15, or 50 set forth in FIGS. 10 and 11. The secret key 94 and the public key 96 (set forth in FIG. 13) define a key pair. In one embodiment, key pairs are generated on each mobile computing device or within each service. The operating environment 100 does not rely on a central key server to store public keys and provide access to them for authentication of document tokens. Instead, users of the mobile computing devices exchange public keys, which are used by the token-enabled server 126 to authenticate document tokens, before the document token is passed from one user to the next. This aspect of the invention provides that document tokens may be issued to a holder independent of whether or not the holder is known by the token-enabled server 126.

As set forth above, either an issuer or a holder can issue or pass along a document token. However, when a document token is initially issued it takes the form of the original token 12 shown in FIG. 10. Subsequently, when the original token 12 is passed to another holder, the document token takes the form of token 17. In each case, to properly create a document token the issuer's content 10 and the holder's content 15 must be completed and signed using token signature generator 90 to produce signatures 18 and 20, respectively.

G.5 Preparing A Document Token to Be Cashed In

When a user of a mobile computing device validates (or cashes in) a document token from the token-enabled server 126, the user must generate a (new) document token. The (document) token that is generated and received by the token-enabled server 126 takes the form of tokens 16 or 52, shown in FIG. 10 or 11, respectively. A token can only be cashed in if it contains a holder's content 14 or 50 that has a current time stamp 44 which is signed. The window size 28 in the issuer content 10 defines a small window of time that cannot be exceeded when the token-enabled server 126 receives the token. The window size 28 helps prevent replay attacks since a valid token that is stolen becomes invalid once the time defined by the time stamp and the window size exceeds the current time. It will be appreciated by those skilled in the art that a holder of a token and an issuer of a token can be the same user of a mobile computing device. This dual role performed by an issuer permits issuers to cash in their own tokens.

G.6 Authenticating A Document Token At The Token-Enabled Server

Figure 13:
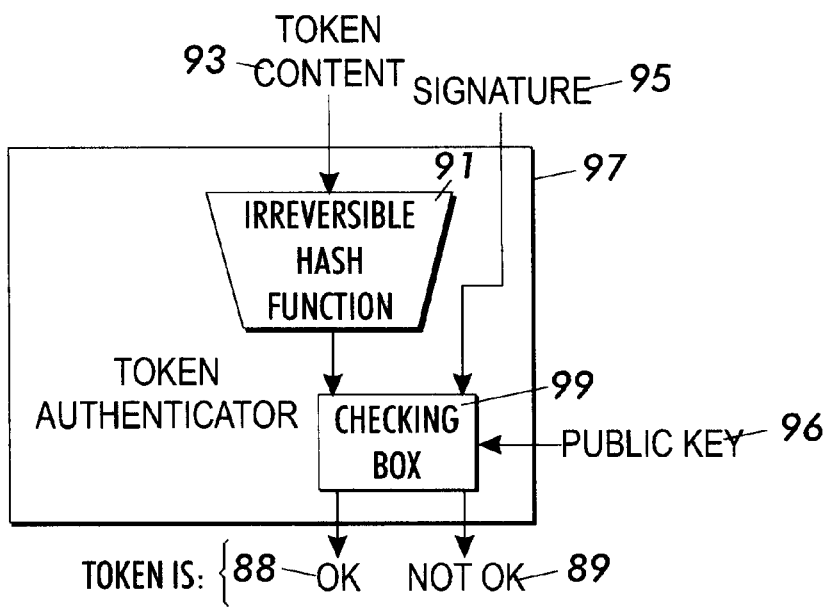
FIG. 13 illustrates the manner in which a document token is authenticated.

FIG. 13 illustrates a token authenticator 97 for authenticating document tokens. To authenticate a token, token content 93 is run through the irreversible hash function 91 and input along with the signature 95 to a checking box 99. The checking box 99 verifies the authenticity of the token content using a public key 96 that corresponds to the secret key 94. The public key 96 refers to either the public key of the issuer identified by hint 32, the public key of the holder 22, or the public key of holder2 54. If the token was authentically produced by the owner of secret key 94, then the output from authenticator 97 is an ok signal 88; otherwise, a not ok signal 89 is produced.

As set forth above, access to a document referenced by a document token is obtained through a token-enabled server. Each token-enabled server is configured with a list of public keys that it will accept when authenticating and cashing in a document token. Advantageously, the token-enabled server need only be configured with those public keys of the users who issue document tokens. Because of the manner in which the document token 12 is defined, the public key of the holder of the document token is always known and guaranteed to be valid if it was received from a trusted source by the issuer.

Figure 14:
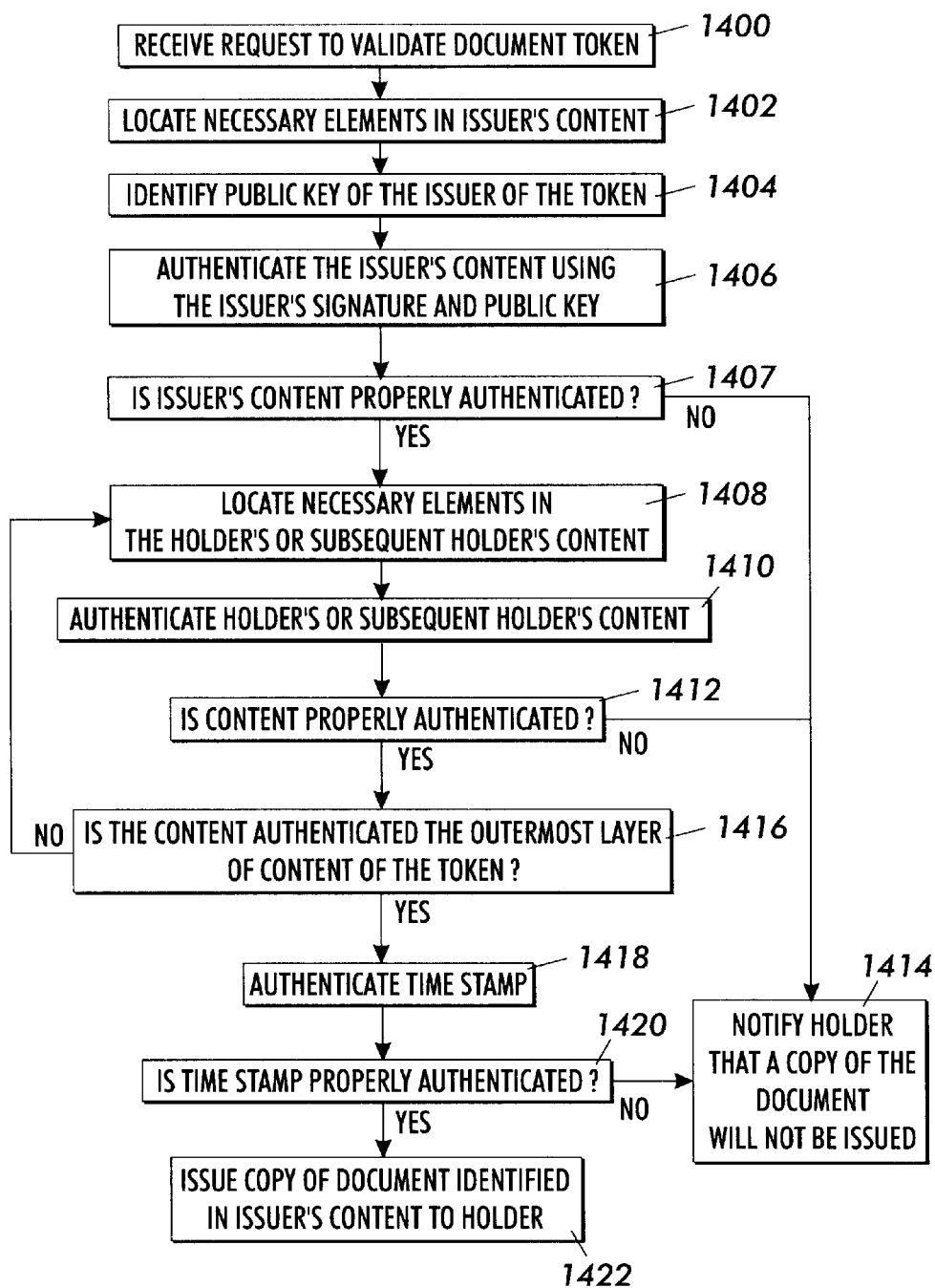
FIG. 14 is a flow diagram that sets forth the steps performed by the token-enabled server shown in FIG. 1 (or secure document server shown in FIG. 2) when authenticating a document token.

FIG. 14 is a flow diagram that sets forth the steps performed by the token-enabled server 126 (or the secure document server 204) when authenticating and cashing in a document token. Initially, at step 1400, a request is received by the transaction server (or the recipient mail client 229) to validate a document token. The document token is held by either the issuer of the token, a holder of the token, or one of a plurality of subsequent holders of the token. When a document token is properly validated a copy of the document which it references is returned to the holder of the document token. If the token-enabled server cannot properly validate the document token, a message is returned indicating that no copy of the document can be issued to the holder of the document token.

Once a document token is received from a holder or issuer of the document token, the transaction server locates, at step 1402, elements in the issuer's content 10 that are necessary for proper authentication and issuance. Elements in the issuer's content 10 necessary for proper authentication and issuance include the public key of the holder 22, the document URL 26, and the hint to the issuer's public key 32. At step 1404, the public key of the issuer is identified using the hint to the issuer's public key 32. It will be appreciated, however, by those skilled in the art that step 1404 need not be performed but instead hint 32 can instead be storing the issuer's public key.

When step 1404 is performed, the issuer's public key is acquired by exchanging the hint 32 for a public key using the certificate server 140. At step 1406, the issuer's content 10 is authenticated using the token authenticator 97 shown in FIG. 13. For example, the issuer's content 10 is authenticated by inputting the issuer's content 10 for token content 93, the issuer's signature 18 for signature 95, and the issuer's public key identified at step 1404 for public key 96. If the content is properly authenticated at step 1407 then step 1408 is performed; otherwise, step 1414 is performed. At step 1414, a notification is returned to the holder of the document token that a copy of the document will not be issued because the token is invalid.

After properly authenticating the issuer's content, the elements necessary to authenticate the holder's or subsequent holder's content are located in the document token at step 1408. The holder's or subsequent holder's content can be, for example, any of the token contents identified by reference numbers 14, 15, or 50 in FIGS. 10 and 11. When a token has been passed between multiple holders, the holder's content of these holders is similar to the holder's content 15 illustrated in FIG. 11. Furthermore, it will be appreciated by those skilled in the art that the document token 52 may encapsulate any number of additional holder's content 15. Public keys to authenticate the holder's content 14 (shown in FIG. 10) are identified in the issuer's content 10 at step 1404; otherwise, the public key to authenticate a subsequent holder's content 52 (or yet another subsequent holder's content not shown) is identified at step 1408. Signatures associated with each holder's content are located also at step 1408.

At step 1410, using the information located at step 1408, the token content is authenticated using the token authenticator 97. When properly authenticated at step 1412, step 1416 is performed; otherwise, step 1414 is performed. At step 1416, the token content is examined to determine whether the content authenticated is the outermost content of the document token. If it is the outermost layer of content, the time stamp 44 from that content is authenticated at step 1420; otherwise, step 1408 is repeated. To authenticate the time stamp in a document token, the difference between the current time at which the document token is being authenticated and the time stamp 44 is within the window size 28. If the time stamp is properly authenticated at step 1420, the token-enabled server 126 issues a copy of the document identified in the document token to its holder at step 1422; otherwise, step 1414 is performed. Part of issuing a copy of the document identified by the document token at step 1422 is the act of fetching the copy from its location on networks 116 or 122 identified by the document URL 26.

G.7 Definitions of the Fields of Document Tokens

The public key of holder 22 is provided to the issuer by the holder. If not provided directly from the issuer, the public key can also be obtained in other ways such as a certifying authority.

The issuer specifies in the access rights field 24 (or 56) those access rights the holder should have with regard to the referenced document. Examples of access rights that can be specified include: read, write, delete, "can be passed onto others," "can be cashed in by anyone," "can only be cashed in four times," and "not valid after Jan. 1, 2000." The document URL (Uniform Resource Locator) 26 defines where the document identified by the token is located. For example, a URL generally consists of three fields: a protocol field, a field with the DNS (Domain Name System) name of a host system, and a file name field.

The window size 28 is a length of time after which a token that is time stamped is no longer valid.

The firewall address 30 contains the IP address of a firewall gatekeeper that is to be used if the token is to be cashed in from outside its native network.

The hint to the issuer's public key 32 is used by the token-enabled server 126 (or secure document server 204) in looking up which public key the signature of the token 12 should be authenticated with. In an alternate embodiment, the hint to the issuer's public key is replaced with the issuer's public key.

The serial number 34 (or 58) is an arbitrary number added by the issuer of the token at the time that it is generated to avoid replay attacks. It can be used by the token-enabled server 126 (or secure document server 204) to identify whether it has seen a token before by recording in an access list how many times a token is cashed in. For example, a serial number is set forth in the issuer's content so that the document server can identify the difference between two tokens issued, for the same document, that are passed from the same issuer to the same holder.

The comment field 36 is a textual field to be filled in with, for example, a hint about the contents of the document that a document token references.

The version number 38 specifies the version of the document token format in use.

The HTTP verb 40 and the HTTP body 42 are parameters necessary to gain access to the document URL 26.

The time stamp 44 is used to validate the document token using the window size 28.

The actual URL 48 (or 60) is needed if the final holder wishes to obtain a document that is not the same as the one referenced in the issuer's section of the URL. For example, the document URL 26 may specify a directory and the Actual URL 48 may specify a filename within that directory.

H. Summary

It will be appreciated by those skilled in the art that document tokens can be advantageously used to refer to a document that is being constantly updated. This obviates the need to retransmit newer versions of the document; only a message that the referenced document has been updated needs to be sent to the intended recipients of the document. A method for automatically distributing notices of document updates is disclosed in U.S. Pat. No. 6,430,601, entitled "Mobile Document Paging Service" Now U.S. Pat. No. 6,430,601.

It will be further appreciated that the present invention may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microcomputer or microcomputer systems being utilized.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for operating on a network a secure document server that receives from a holder of a document token a request for a copy of a document identified by the document token, the document token including issuer content and a signature from an issuer and holder content and a signature from the holder, said method comprising the steps of:

locating in the issuer content a document identifier, a public key of the issuer, and a public key of the holder;

the document identifier specifying where the document is stored on the network;

authenticating the issuer content of the document identifier with the public key of the issuer;

locating in the holder content of the document a time stamp;

the time stamp identifying when the holder of the document token requested the copy of the document;

authenticating the holder content of the document identifier with the public key of the holder;

authenticating the time stamp by verifying that the time stamp is within a predetermined window of time; and issuing, to the holder of the document identifier, a copy of the document identified by the document identifier when the issuer content and the holder content are positively authenticated by said authenticating steps;

said issuing step providing secure access to the document without prior knowledge of the public key of the holder.

2. The method according to claim 1, further comprising the step of receiving, from the issuer, the public key of the issuer.

3. The method according to claim 2, wherein said receiving step receives the request from an issuer operating a mobile computing device.

4. The method according to claim 1, further comprising the step of receiving a request for a copy of the document from a holder of the document token operating a mobile computing device.

5. The method according to claim 1, further comprising the steps of:

locating a serial number in the issuer content of the document token;

identifying, in an access list, a number indicating how many times document tokens with the serial number have been cashed; and authenticating the issuer content by verifying that the number of times the document token has been cashed does not exceed a predefined maximum number.

6. The method according to claim 1, further comprising the steps of:

receiving from a recipient mail client the request for a copy of the document identified by the document token; and issuing to the recipient mail client a copy of the document identified by the document identifier.

7. The method according to claim 1, further comprising the step of substituting for the document, which is attached to an email message, the document token identifying the document.

8. The method according to claim 9, wherein said substituting step is performed by a proxy server.

9. The method according to claim 1, further comprising the steps of:

receiving an email message from a sender mail client with the document token attached thereto; and substituting for the document token in the email message the copy of the document issued by said issuing step.

10. A secure document server for operating on a network and receiving from a holder of document token a request for a copy of a document identified by the document token, the document token including issuer content and a signature from an issuer an holder content and a signature from the holder, said secure document server comprising:

means for locating in the issuer content a document identifier, a public key of the issuer, and a public key of the holder;

the document identifier specifying where the document is stored on the network;

means for authenticating the issuer content of the document identifier with the public key of the issuer;

means for locating in the holder content of the document a time stamp;

the time stamp identifying when the holder of the document token requested the copy of the document;

means for authenticating the holder content of the document identifier with the public key of the holder;

means for authenticating the time stamp by verifying that the time stamp is within a predetermined window of the; and means for issuing, to the holder of the document identifier, a copy of the document identified by the document identifier when the issuer content and the holder content are positively authenticated by said authenticating means;

said issuing means providing secure access to the document without prior knowledge of the public key of the holder.

11. The secure document server according to claim 10, further comprising a mobile computing device for transmitting a request for a copy of the document from a holder of the document token.

12. The secure document server according to claim 10, further comprising:

means for locating a serial number in the issuer content of the document token;

means for identifying, in an access list, a number indicating how many times document tokens with the serial number have been cashed; and means for authenticating the issuer content by verifying that the number of times the document token has been cashed does not exceed a predefined maximum number.

13. The secure document server according to claim 10, further comprising means for receiving, from the issuer, the public key of the issuer.

14. A secure document mail system operating on a network, comprising:

a sender mail client for sending an email message with a document attachment;

the sender mail client including an encoder for substituting in the email message a document token for the document attachment;

a recipient mail client or receiving the email message and the document token from a mail server; the recipient mail client including a decoder;

a secure document server for receiving from the recipient mail client a request for a copy of a document identified by the document token in the email message;

the document token including issuer content and a signature generated by the encoder of the sender mail client, and holder content and a signature generated by the decoder of the recipient mail client;

wherein the secure document server further comprises:

means for locating in the issuer content a document identifier, a public key of the issuer, and a public key of the holder;

the document identifier specifying where the document is stored on the network;

means for authenticating the issuer content of the document identifier with the public key of the issuer;

means for locating in the holder content of the document a time stamp;

the time stamp identifying when the holder of the document token requested the copy of the document;

means for authenticating the holder content of the document identifier with the public key of the holder;

means for authenticatig the time stamp by verifying that the time stamp is within a predetermined window of time; and means for issuing, to the recipient mail client, a copy of the document attachment identified by the document identifier when the issuer content and the holder content are positively authenticated by said authenticating means;

said issuing means providing secure access to the document attachment without prior knowledge of the public key of the holder.

15. The secure document mail system according to claim 14, wherein the recipient mail client further comprises means for substituting the copy of the document for the document token in the email message.

16. The secure document mail system according to claim 14, wherein the document identifier is a uniform resource locator.

* * * * *